United States Patent
Julien et al.

(10) Patent No.: US 11,900,088 B2
(45) Date of Patent: Feb. 13, 2024

(54) METHOD FOR GENERATING A BINDING BETWEEN A C/C++ LIBRARY AND AN INTERPRETED LANGUAGE, AND CARRYING OUT THE METHOD TO TRANSFORM A THREE-DIMENSIONAL (3D) MODEL

(71) Applicant: Movida Production, Orléans (FR)

(72) Inventors: Emmanuel Julien, Orléans (FR); François Gutherz, Orléans (FR)

(73) Assignee: Movida Production, Orléans (FR)

(*) Notice: Subject to any disclaimer, the term of this patent is extended or adjusted under 35 U.S.C. 154(b) by 0 days.

(21) Appl. No.: 17/282,563

(22) PCT Filed: Oct. 4, 2019

(86) PCT No.: PCT/FR2019/052362
§ 371 (c)(1),
(2) Date: Apr. 2, 2021

(87) PCT Pub. No.: WO2020/070458
PCT Pub. Date: Apr. 9, 2020

(65) Prior Publication Data
US 2021/0342135 A1    Nov. 4, 2021

(30) Foreign Application Priority Data

Oct. 4, 2018  (FR) ...................................... 1859224

(51) Int. Cl.
*G06F 8/54* (2018.01)
*G06F 9/448* (2018.01)
*G06F 8/41* (2018.01)

(52) U.S. Cl.
CPC ................ *G06F 8/54* (2013.01); *G06F 8/41* (2013.01); *G06F 9/449* (2018.02)

(58) Field of Classification Search
CPC ............... G06F 8/54; G06F 9/449; G06F 8/41
(Continued)

(56) References Cited

U.S. PATENT DOCUMENTS 5,083,262 A     1/1992   Haff, Jr.
5,361,350 A *  11/1994   Conner ................. G06F 9/4488
(Continued)

FOREIGN PATENT DOCUMENTS

CN          101814024          6/2014

OTHER PUBLICATIONS

Cottom, "Using Swig to Bind C++ To Python", IEEE, pp. 83-97 (Year: 2003).*

(Continued)

*Primary Examiner* — Anil Khatri
(74) *Attorney, Agent, or Firm* — TraskBritt (57) ABSTRACT

The present disclosure relates to a method for generating a binding between a C/C++ library and one or more interpreted high-level languages, in order to expose the functionalities of the C/C++ library to this or these high-level languages, involving the following steps: a step of writing a definition of the binding in the form of a high-level language, a step of processing this definition in order to produce binding elements, a step of grouping the binding elements around each of the high-level language(s) to produce a C++ binding code, and a step of compiling the C++ code and linking this to the C/C++ library. This can be used, in particular, to implement human-machine interfaces for terrestrial, aerial or maritime mobile equipment.

13 Claims, 6 Drawing Sheets

(58) Field of Classification Search
USPC .................................................. 717/138–154
See application file for complete search history.

(56) References Cited

U.S. PATENT DOCUMENTS

| | | | | | |
|---|---|---|---|---|---|
| 5,822,580 | A | * | 10/1998 | Leung | G06F 9/465 707/999.103 |
| 5,872,973 | A | * | 2/1999 | Mitchell | G06F 9/465 719/330 |
| 6,209,040 | B1 | * | 3/2001 | Acton | G06F 9/44521 712/E9.084 |
| 6,536,037 | B1 | * | 3/2003 | Guheen | G06F 8/71 703/2 |
| 6,718,291 | B1 | * | 4/2004 | Shapiro | G06F 30/23 703/2 |
| 7,013,469 | B2 | * | 3/2006 | Smith | G06F 3/00 719/318 |
| 7,093,231 | B2 | * | 8/2006 | Nuss | G06F 8/31 717/114 |
| 7,496,892 | B2 | * | 2/2009 | Nuss | G06F 8/31 709/200 |
| 8,321,848 | B2 | * | 11/2012 | Johnson | G06F 8/425 714/2 |
| 8,739,137 | B2 | * | 5/2014 | Siskind | G06F 17/10 717/136 |
| 8,856,774 | B1 | * | 10/2014 | Kulaga | G06F 21/57 717/168 |
| 8,886,671 | B1 | * | 11/2014 | Ro | G06F 16/22 707/781 |
| 10,459,706 | B1 | * | 10/2019 | Little | G06T 17/10 |
| 11,036,482 | B1 | * | 6/2021 | Samuel | G06F 8/51 |
| 11,597,153 | B1 | * | 3/2023 | Barbati | B29C 64/118 |
| 2002/0010667 | A1 | | 1/2002 | Kant et al. | |
| 2005/0188362 | A1 | * | 8/2005 | Metzger | G06F 8/443 717/151 |
| 2010/0299660 | A1 | * | 11/2010 | Torgersen | G06F 8/54 717/148 |

OTHER PUBLICATIONS

Carpentier et al., "The Pinocchio C++ library", IEEE, pp. 614-619 (Year: 2019).*
Chamberlin et al., "PyGB: GraphBLAS DSL in Python with Dynamic Compilation into Efficient C++", IEEE, pp. 310-319 (Year: 2018).*
Vemulapati, "An Extensible Dynamic Linker for C++", Massachusetts Institute of Technology, May 15, 1995, pp. 1-55 (Year: 1995).*
Mommen et al., "Verifying C++ Dynamic Binding", ACM pp. 1-7 (Year: 2023).*
Cottom, "Using Swig To Bind C++ To Python", IEEE, pp. 88-97 (Year: 2003).*
Babati et al., "On the Validated Usage of the C++ Standard Template Library", ACM, pp. 1-8 (Year: 2019).*
Jarvi et al., "Library Composition and Adaptation using C++ Concepts", ACM, pp. 73-82 (Year: 2007).*
Beazly, D.M., Automated Scientific Software Scripting with SWIG, Future Generation Computer Systems, vol. 19, (2003), pp. 599-609.
Fernique et al., AutoWIG: Automatic Generation of Python Bindings for C++ Libraries, PeerJ Computer Science, vol. 4:e149, (2018) 31 pages.
International Search Report for International Application No. PCT/FR2019/052362 dated Feb. 12, 2020, 2 pages.
International Written Opinion for International Application No. PCT/FR2019/052362 dated Feb. 12, 2020, 8 pages.
European Communication pursuant to Article 94(3) EPC for European Application No. 19801961, dated Feb. 24, 2023, 7 pages.

* cited by examiner

METHOD FOR GENERATING A BINDING BETWEEN A C/C++ LIBRARY AND AN INTERPRETED LANGUAGE, AND CARRYING OUT THE METHOD TO TRANSFORM A THREE- DIMENSIONAL (3D) MODEL

CROSS-REFERENCE TO RELATED APPLICATIONS

This application is a national phase entry under 35 U.S.C. § 371 of International Patent Application PCT/FR2019/052362, filed Oct. 4, 2019, designating the United States of America and published as International Patent Publication WO 2020/070458 A1 on Apr. 9, 2020, which claims the benefit under Article 8 of the Patent Cooperation Treaty to French Patent Application Serial No. 1859224, filed Oct. 4, 2018.

TECHNICAL FIELD

The present disclosure relates to a method for generating a binding between a C/C++ library and an interpreted language.

It also relates to carrying out the method for generating a binding in order to transform a three-dimensional (3D) model, in particular, to be able to be embedded in a human-machine interface of a mobile device.

The field of the present disclosure is that of human-machine interfaces, and more particularly human-machine interfaces embedded in terrestrial, air or maritime mobility systems.

BACKGROUND

The binding generator is a tool that makes it possible to effectively achieve a binding between a C/C++ library and an interpreted language. The issue of the binding consists in given access to a functionality/performance pair of a low-level language (C++) from a high-level language (PYTHON®, JAVA®, C#, Haskell, etc.).

In general, the high-level languages have lower performances than low-level languages. They are slower and/or take up more memory. In contrast, the high-level languages free the developers of a number of tasks, including memory management, in particular, creating objects and destroying them.

The high-level languages are considerably more accessible. They make it possible to more quickly achieve a functional result, which gives them an ideal place in the rapid prototyping phase. However, the question of performance excludes them from the industrialization phase. The need is therefore that of having both the performance of the C++ and the accessibility of the high-level languages.

This problem is encountered in the project management, in particular, during the design of a human-machine interface, which requires the joint contribution of hardware engineers using the low-level languages, and business experts using the high-level languages. The difficulty is that of organizing a methodology that is the synthesis of skills that are as varied as they are conflicting.

In particular, in the production of an interactive application having 3D content, one of the main issues is that of "translating" (converting) the 3D models originating from a CAO application into the proprietary format of the 3D engine in which the application is developed. This complex task is found at the intersection of the skills cited above. The business experts have the knowledge of the functional and aesthetic objections to be achieved, but their technical parameters do not allow them to act in the industrialization phase. At the other end of the spectrum, the low-level engineers have technical skills in the processing and display of 3D data on an industrial platform, but do not have the knowledge necessary for conversion/translation of the 3D data that is in accordance with the objectives of the business experts. There is therefore a gap between these skills that prevents the implementation of human-machine interfaces in accordance with the functional and aesthetic objectives and the technical specifications imposed by the industrial hardware.

The conversion/translation always brings about a loss of information, and the 3D CAO model does not contain the "material" attributes required for rendering in 3D.

The stopgap measure for overcoming the gap mentioned above consists in making adjustments, once the translation has been carried out. This is the approach selected by the solutions such as Unreal Engine and Unity 3D, which consist in accumulating the human means and the workforce, in particular, when approaching the end of the project. This practice, even if it is admitted that it functions in the entertainment industry, is not suitable for the industrial sector.

It is thus noted that there is no solution for implementing the binding between the high-level and low-level languages and, as a result, for making it possible to synthesize multi-disciplinary groups within the industrial HMI project.

Furthermore, there is currently a high demand, expressed, in particular, by motor vehicle manufacturers, for ergonomic, efficient and highly dynamic human-machine interfaces (HMI).

In the prior art, SWIG is a program that makes it possible to generate such "bindings." It is open-source, free access, and makes it possible to link programs written in C/C++ to a variety of "high-level" programming languages. The target languages include conventional script languages such as JAVASCRIPT®, PERL®, PHP, PYTHON®, Tcl and RUBY®. SWIG suffers from too great a technical debt, and unequal treatment of the target languages supported. Thus, it is often the case that a desirable functionality is supported only in some target languages, and sometimes in none, which constitutes a significant handicap for the integration of expert scripts in an automated process for shaping 3D models.

Furthermore, if it is proposed to integrally automate the generation of the binding, it is found in practice that the projects using SWIG demand an explicit intervention by the developer in order to correct the non-functional code automatically generated. The paradox is thus achieved when the quantity of code written to correct the incorrect generated code is largely greater than that which would be reasonably anticipated for reaching the expected level of functionality of the binding.

Moreover, within the context of a project carried out by a multidisciplinary team, access to clear and synthetic documentation by business experts is an absolute condition for achieving the objectives. Since the advent of the version 2.0, SWIG no longer offers this functionality. If the binding generated provides access to low-level functionalities from a high-level language, the business experts and the capacity for producing the high-level code have no documentation and reference support for the exhibited API.

The document U.S. Pat. No. 5,083,262A describes a language binding method intended for graphics functions, having the aim of allowing for one application program to be used in different processing environments.

Establishing a specific binding to a language between high-level graphical application programs written in a specific programming language makes it possible to transport a graphical application program between and used in different graphical treatment systems. Just one portable graphical application program can be used with any of the graphical processors with which an application language binding has been established to produce graphics on an output peripheral.

The document CN101814024A discloses a design tool for a multiplatform 3D interface, used mainly for developing large-screen interactive 3D human-machine interfaces. The tool comprises a system kernel capable of invoking systematic functions in a multi-platform manner in which the kernel handles the main functions of a current public platform and can perform self-testing to identify the difference between the system functions of different exploitation systems.

The combination of the SWIG technology legacy and the fragmented support thereof of the C++ functionalities makes it extremely complicated and expensive to ensure the development and the maintenance thereof. The few software alternatives to SWIG are generally concerned only with one single target language, while being significantly more limited than SWIG in terms of supported C++ functionalities.

Moreover, with the advent of the new C++ standard (C++11), the new language constructions are not particularly or not supported, and a plurality of usage configurations of the new C++ functionalities are not correctly supported by SWIG.

In the absence of a solution, in a large number of human-machine interface design and development centers, the code of a 3D model generated by a CAD tool is re-written in order to be able to embed it on a mobile platform. The use of a specific format inherited from the CAD environment for the storage of 3D data suitable for the restrictions of the embedding poses the problem of the versatility and the flexibility for combatting the restrictions of an embedded environment.

The document "Automated scientific software scripting with SWIG" by D. M. Beazley in the review Future Generations Computer Systems 19 (2003) pages 599-609 discloses a method for generating a binding between a C/C++ library and one or more interpreted high-level languages with a view to exhibiting the functionalities of said C/C++ library to the interpreted language, comprising a step of writing a definition of the binding in the form of a high-level language, a step of processing the definition to produce binding elements, and a step of compiling the C++ code and linking to the C/C++ library.

The document "AutoWIG: Automatic Generation of Python Bindings for C++ Libraries" by P. Fernique et al, XP080950591, discloses an automatic binding generation method for C++ libraries.

The aim of the present disclosure is that of proposing a binding generation method that makes it possible to combine, with the performance of a 3D C++ library, the flexibility of a high-level language on the embedded material.

BRIEF SUMMARY

This object is achieved by means of a method for generating a binding between a C/C++ library (A) and a software environment of one or more high-level interpreted languages, with the view to exhibiting the functionalities of the C/C++ library to the interpreted language, the method comprising the following steps, implemented by a computer:

a step of processing a definition of the binding (C), the definition having been previously written in high-level language and comprising a list of functions to produce binding elements, a step of generating a list of binding elements exposed to the high-level languages to produce a set of functions in C++ that are exposed to the high-level language(s), a step of compiling the C++ code (D) and linking to the C/C++ library (A), wherein the step of generating a binding is furthermore configured to allow the C/C++ library to call a written function in high-level languages (callback) to expand the functionalities thereof.

The definition of the binding may also comprise a list of functions, anticipated parameters for the functions, and returned values.

In a particular version of the present disclosure, the step of definition processing comprises a distribution of processing between:

functionalities of each of the or of the high-level language [B], functionalities of the C++ language that are supported in a transparent manner by the binding and will be made accessible in the high-level language.

The binding method according to the present disclosure may advantageously also comprise a step of processing documentation attached to the C/C++ library (A) as a target high-level language (B2) and generating an XML file.

The method may further comprise, following the compilation step, obtaining a dynamic library (E) integrating the C/C++ library (A) and an interface layer compiled from the C++ code (A) originating from the compilation step, and a static library (E) provided for embedding the high-level interpreted language(s) directly into the C++ code originating from the compilation step.

According to another aspect of the present disclosure, a computing module is proposed, implementing the binding method according to any of the preceding claims, operating with a C/C++ library (A) and one or more high-level interpreted languages, with the view to exhibiting the functionalities of the C/C++ library to the interpreted language, the module comprising:

means for processing a definition of the binding, preferably written in high-level language and comprising a list of functions to produce binding elements, means for assembling the binding elements toward each of the or the high-level languages to produce a C++ binding code (D), means for generating a list of binding elements exposed to the high-level languages to produce a set of functions in C++ that are exposed to the high-level language(s), means for compiling the C++ code (D) and linking to the C/C++ library (A).

According to the present disclosure, the means for generating a binding are furthermore configured to allow the C/C++ library to call a written function in high-level languages (callback) to expand the functionalities thereof.

According to yet another aspect of the present disclosure, an implementation of the binding method according to the present disclosure is proposed, in a method for transforming a 3D module originating from a C/C++ library (A) with a view to being able to be embedded in an item of equipment in which a "business" application is written in a high-level language (B), importing a dynamic library (E) and accessing, via the dynamic library (E), the functionalities of the C/C++ library (A).

The implementation of the binding method according to the present disclosure may, in particular, relate to the transformation of 3D models originating from a C/C++ library (A) into 3D models capable of being embedded in equipment within mobility systems.

In the binding method according to the present disclosure, translation rules are implemented, based on the requirements of each project, in order that the translation should automatically give the optimal result once the 3D models are toggled in the 3D engine. In order for these rules to be accessible to a person skilled in the art ("graphic designer/integrator"), it is inconceivable to have to implement them in C++.

The binding method according to the present disclosure can, in particular, take into account the language Lua, which is a free script language that is well known by designers of 3D models, which makes it possible to write translation rules in Lua.

Advantage is taken of the binding generator according to the present disclosure for easily integrating the Lua language within all the tools of a system for transforming 3 models.

The binding method according to the present disclosure thus offers the developer the possibility of describing, in a simple manner, the "high-level" interface that is needed, and takes care of the automatic production of the C++ binding code, as well as the resource management mechanisms.

The generator method according to the present disclosure gives the developer in charge of the binding the possibility of implementing the functionalities of the target languages, language by language. The developer thus specifies what is explicitly exhibited, unlike SWIG, which attempts, but has failed, to exhibit everything implicitly.

With just one description, the binding generator according to the present disclosure automatically produces all the bindings to the supported languages. The addition of a support of a language is thus a benefit for all the projects already linked.

The translation of a business application from one target language to another target language is quasi direct and automatable, the APIs (for "application programming interface") generated by the binding generator being strictly identical.

The documentation is considered as a full target language.

The binding generator according to the present disclosure handles the conversion of the C++ types (STD and STL) and gives access to the functionalities of the modern C++. This generator makes it possible to exhibit the types of objects specific to the library in a debugger of the target language.

In a high-level language, all the data are encapsulated with associated metadata. For the sake of efficiency in the occupation of the random-access memory, these languages offer the possibility of storing the data directly within the metadata. This mechanism is made accessible by the binding generator according to the present disclosure. The direct benefit thus obtained is a gain in performance, in memory space, and in complexity (example: integers, floats, vectors, etc.).

It is desirable to be able to call a C++ function from PYTHON® or Lua, but it is also desirable to be able to call a PYTHON® or Lua function from C++. The generator according to the present disclosure implements this mechanism uniformly in all the supported languages. It gives a person skilled in the art the possibility of extending the C++ functionalities without having to know the implementation detail thereof.

It is possible to cite, by way of example, an implementation of an optic effect on the image, which requires the ability of insertion directly at the center of an image rendering pipeline, with a callback of a finalizer module and a callback from a real-time physical engine. The binding generated can be used via a dynamic library (DLL) or a static library (integrated or binary).

This flexibility makes it possible, for example, to integrate the Lua language into the library for displaying and manipulating 3D models, without any impact on the memory performance or occupation, and leads to the apparent paradox of being able to import Lua into Lua, which contributes to offering multi-core capacities to non-C++ developers. Likewise, Lua is accessible to all the PYTHON® developers.

BRIEF DESCRIPTION OF THE DRAWINGS

Other advantages and features of the present disclosure will emerge from reading the detailed description of implementations and embodiments, which are in no way limiting, and the accompanying drawings.

DETAILED DESCRIPTION

Embodiment

Since these embodiments are in no way limiting, it is, in particular, possible to envisage variants of the present disclosure that comprise only a selection of features described or illustrated in the following, in a manner isolated from the other features described or illustrated (even if this selection is isolated within a phase comprising the other features), if this selection of features is sufficient for providing a technical advantage or for distinguishing the present disclosure from the prior art. This selection comprises at least one feature, preferably functional and without structural details, and/or having some of the structural details if this part alone is sufficient for providing a technical advantage or for distinguishing the present disclosure from the prior art.

Figure 1:
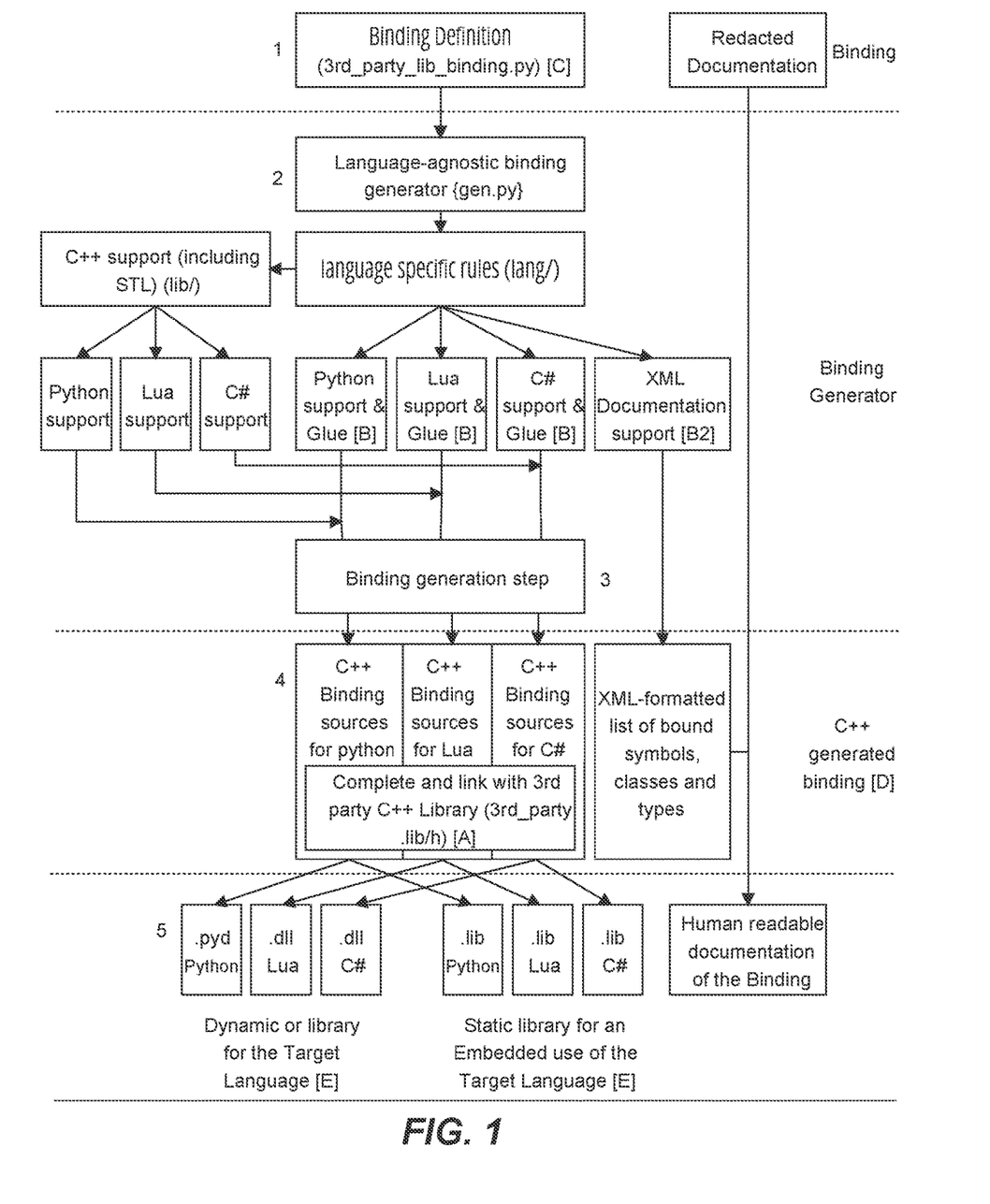
FIG. 1 is a synoptic diagram of an embodiment of a binding generator according to the present disclosure.

An embodiment of a method for generating a binding according to the present disclosure will now be described with reference to FIG. 1.

Step 1. The user of the binding generator according to the present disclosure is in possession of a third C or C++ library [A], the functionalities of which it wishes to exhibit to a language [B] such as PYTHON®, Lua or C#.

The user writes the definition of the binding in the form of a PYTHON® program [C] using the API of the binding generator (itself written in PYTHON®), which describes the API of the library [A] such as it must be exhibited to the developers of the high-level language, by a list of functions as well as their anticipated parameters and the returned values.

Step 2. The binding definition [C], which does not depend on any specificity of the high-level language, is processed by the binding generator that distributes the processing between:
- the functionalities of each high-level language [B] (data management, their lifetime, passage of data between C++ and high-level language, specific paradigms)
- the functionalities of the C++ that are supported in a transparent manner by the binding and will be made accessible in the high-level language (STL/STD types).

In parallel, the documentation is processed as a target high-level language [B2], and generates an XML, file.

Step 3. The last step of the binding generator assembles the binding elements toward each high-level language to produce the C++ binding code [D]. Step 4. The C++ code [D] produced at the output of the generator is designed to be compiled and linked to the third library, the functionalities of which are exhibited.

In parallel, the list of binding symbols can be increased by the documentation drawn up in step 1, thus producing an intelligible reference that is more accessible than a Doxygen documentation, which is prior art for an automatically generated C++ documentation.

Step 5. The result of the compilation of [D] is, electively:
- a dynamic library [E]. The library [E] integrates the library [A] as well as the interface layer compiled from [D]
- a static library for embedding PYTHON®/Lua, etc. directly into the final C++ program.

The final step is the use of the binding. The user writes a "business" application in language [B], importing the dynamic library [E] and accessing, via the dynamic library, the functionalities of the library [A].

The binding generator according to the present disclosure gives the developer in charge of the binding the possibility of implementing the functionalities of the target languages, language by language. The developer specifies what is explicitly exhibited, unlike SWIG, which attempts, but has failed, to exhibit everything implicitly.

With just one description, the binding generator according to the present disclosure automatically produces all the bindings to the supported languages. The addition of a support of a language is thus a benefit for all the projects already linked.

The translation of a business application from one target language to another target language is virtually direct and automatable, the APIs generated by the binding generator being strictly identical, which further increases the portability of the projects developed in C++, the target language selected at the start of the project no longer being a blocking point.

Furthermore, the binding generator according to the present disclosure handles the conversion of the C++ types (STD and STL) and gives access to the functionalities of the modern C++. It makes it possible to exhibit the types of objects specific to the library in a debugger of the target language.

The binding generated can be used via a dynamic library (DLL) or a static library (integrated or binary). This flexibility makes it possible, for example, to integrate Lua into a library of 3D models, without any impact on the performance or the memory occupied.

Figure 2:
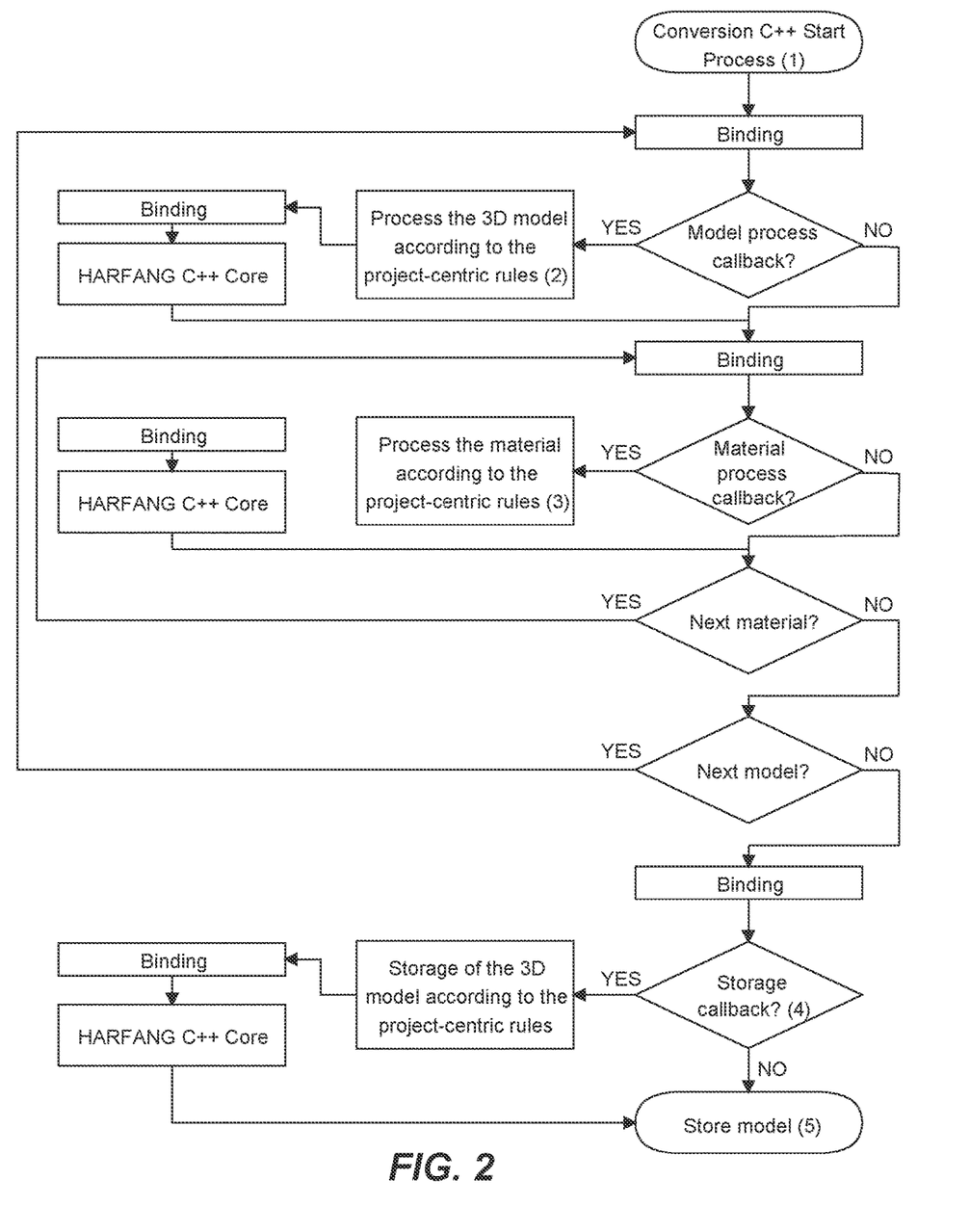
FIG. 2 schematically shows a finalizer process carrying out the binding method according to the present disclosure.

The way in which the binding operations are carried out in a model conversion process involving a "finalizer" module will now be described with reference to FIG. 2.
1. The translation of a 3D model originating from a C/C++ library automatically invokes a finalizer module. By means of a callback system, the interpreter, which functions in parallel with the translation, invokes a set of functions implemented by a person skilled in the art, project by project, and which details the transformations to be made in order that the 3D models sent by the embedded equipment are in accordance with the designers' expectations.
2. If the finalizer module has received an instruction to intervene in the transformation of the 3D model, it has the possibility of amending the morphology of the 3D model, its density, its orientation, etc. All these transformations must have the aim of making the 3D model compatible and optimized for the embedded equipment. This amendment is made via a callback that causes a series of instructions to be executed by the interpreter.
3. If the finalizer has received an instruction to intervene in the transformation of the materials, it has the possibility of entirely redefining them, factorizing them, assigning them processing, light and material algorithms (or shaders), of converting the image stream with the aim of making the data compatible and optimized for the embedded equipment. This amendment is made via a callback that causes a series of instructions to be executed by the interpreter.
4. The finalizer module is invoked as many times as a 3D model or materials are processed by the 3D development tool in high-level language.
5. At the moment of storing the 3D model, the finalizer module may select the format most suitable for the embedded equipment (binary, XML, Json, etc.).

Figure 3:
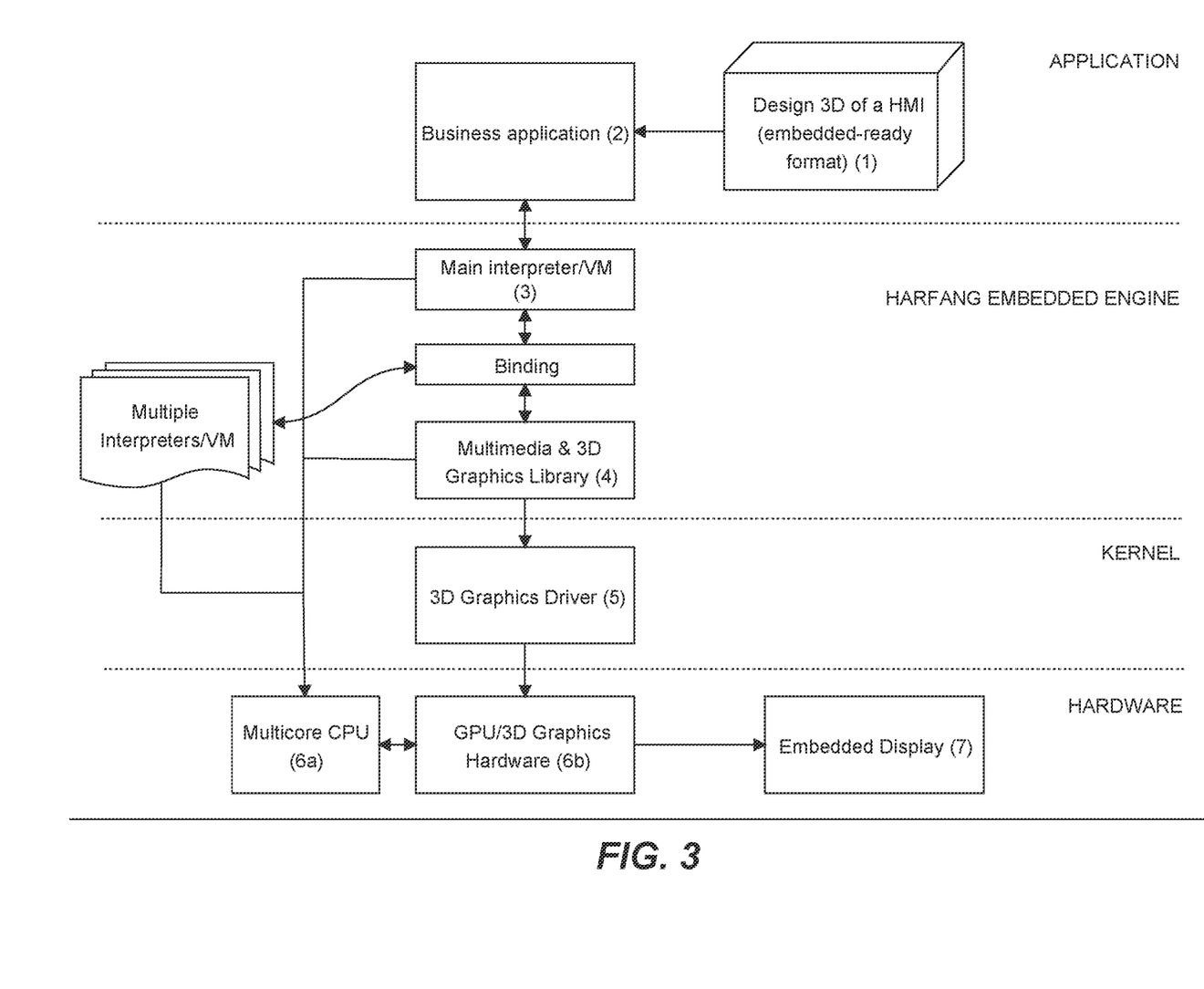
FIG. 3 schematically shows a business application carrying out the binding method according to the present disclosure.

The way in which a binding method according to the present disclosure is implemented in a transformation process of a 3D model originating from a development tool into a model embedded in equipment provided with a human-machine interface will now be described with reference to FIG. 3.
1. A human-machine interface is considered that is designed by a designer and processed by the 3D development tool such that it can be embedded,
2. A business application gives the user of the embedded equipment business functionalities,
3. An interpreter of the interpreted language causes the business application to function and exploits the functionalities of the C++ library,
4. A C++ library exhibits, via an API, 3D, video and audio functionalities,
5. A 3D graphics driver exhibits, via an API (OpenGL), the capacities of a graphics processing unit (GPU) and transforms the instructions given into GPU primitives,
6. The 3D graphics processing unit GPU processes primitives and transforms them into video signals,
7. The screen of the embedded equipment displays the video signal transmitted by the GPU and thus the HMI (1).

Figure 4:
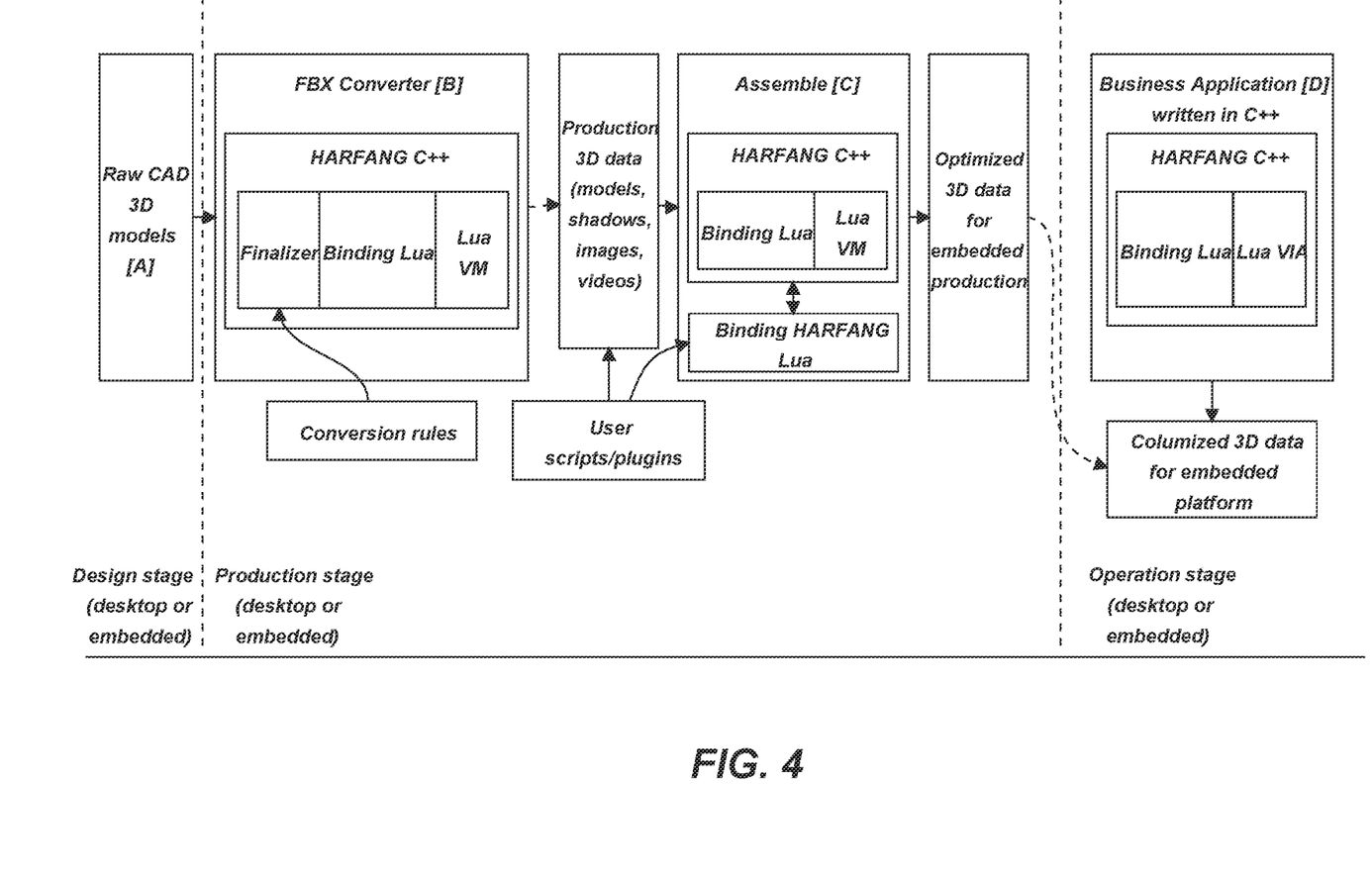
FIG. 4 is a synoptic diagram of an overall transformation process carrying out the binding method according to the present disclosure.

The role played by the method for generating a binding according to the present disclosure, in the different phases of design, production and operation, will now be described with reference to FIG. 4.

In the design phase, carried out on a computer or embedded, 3D models (A) originating directly from CAD (or CAO) tools are manipulated.

In the production phase, also carried out on a computer or embedded, the 3D models are submitted at the input of an FXB converter including a program written in C++ and integrating a finalizer module, a Lua binding module, and a Lua virtual machine. The finalizer module executes the conversion rules. The results of the FXB converter are 3D production data including models, algorithms of the "shader" type, images, and videos. These results are accessible via user scripts and plug-in modules. They are applied at the input of a visual 3D development tool, including a program written in C++ and including a Lua binding module and a Lua virtual machine (VM). This program in C++ is controlled by a Lua binding program. At the output of this C++ program, optimized 3D data are available that are suitable for the optimized embedded 3D platforms.

Figure 5:
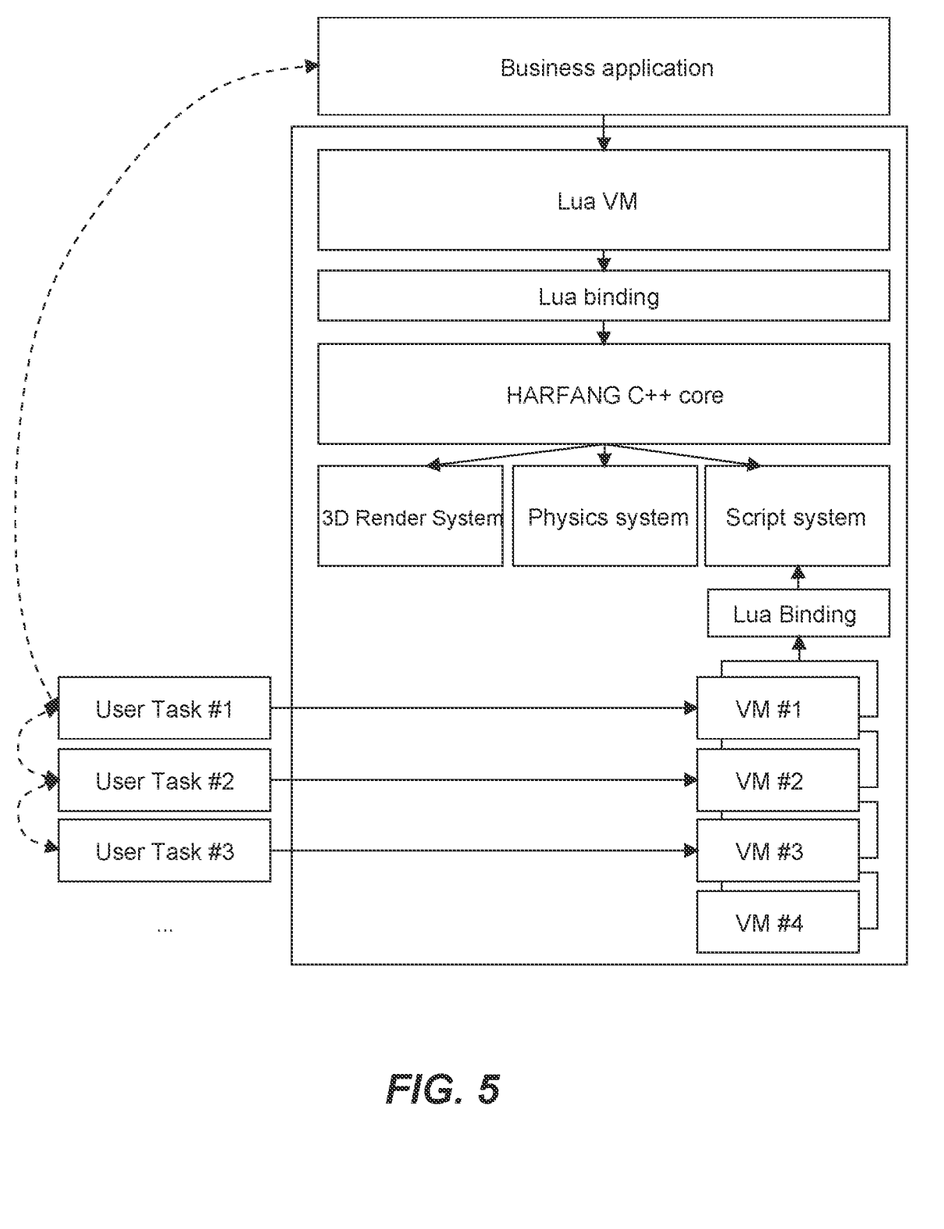
FIG. 5 schematically shows an embedded graphical engine implementing the binding method according to the present disclosure.

An example of the structure of an embedded engine carrying out the binding method according to the present disclosure will now be described with reference to FIG. 5. The embedded engine receives a business application at the input. It includes a Lua virtual machine, the deliverables of which are embedded in a virtual machine VM, the output of which is connected at the input of a Lua binding module, which feeds the input of a dedicated C++ core. The C++ core generates a 3D rendering system, a physical system, and a script system.

The embedded module also contains a set of virtual machines VM1-4, some of which are associated with user tasks. These virtual machines are also connected to the Lua binding module.

Figure 6:
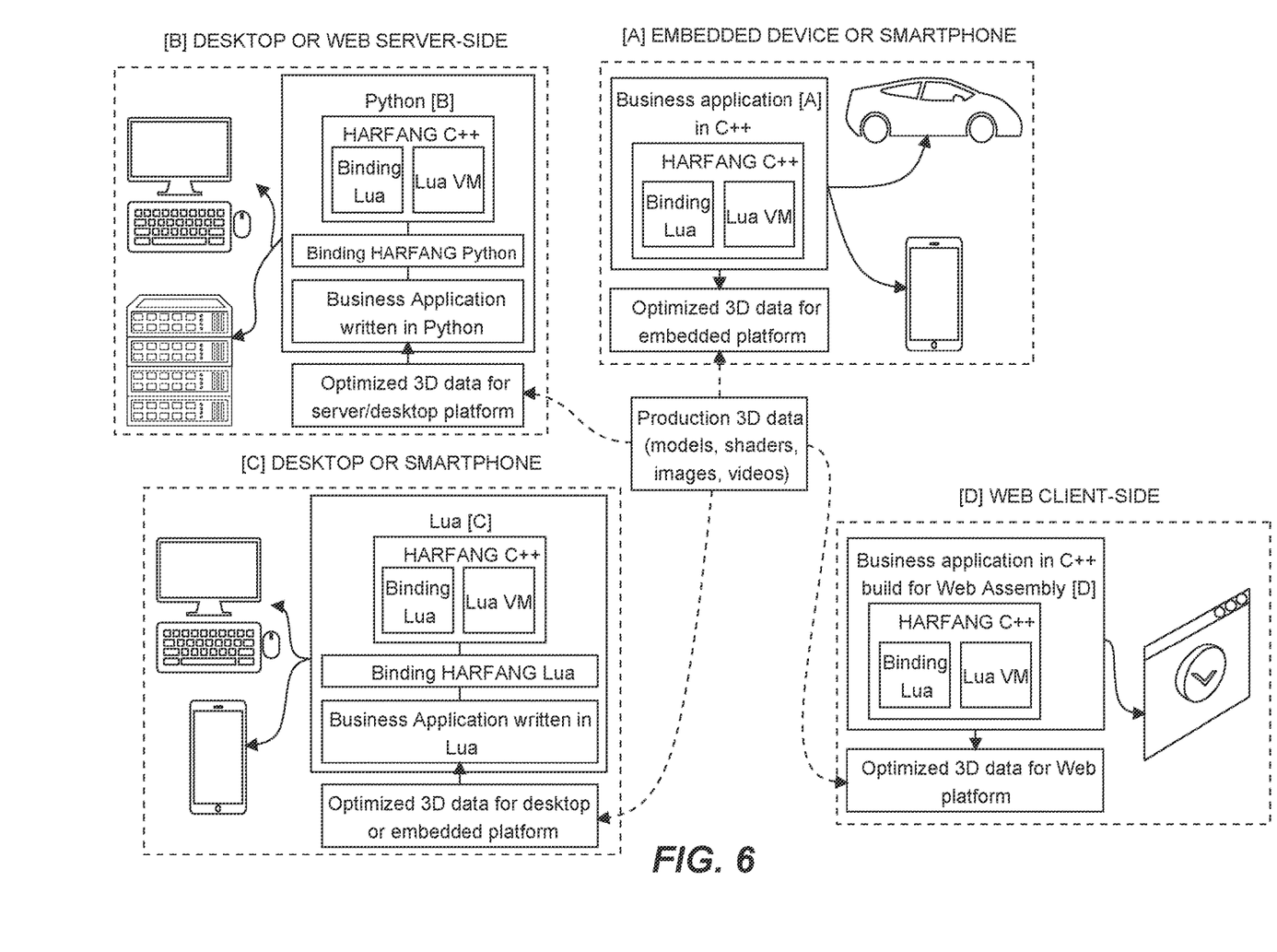
FIG. 6 shows a particular embodiment of the binding method according to the present disclosure, in a multi-user configuration.

With reference to FIG. 6, the binding method according to the present disclosure can be carried out in a multi-platform and multi-use environment:

Embedded Device or Smartphones:

The binding method according to the present disclosure can be embedded in a vehicle or in a smartphone. In this case of use, an API C+ is used, and the business application is implemented in C++. However, by virtue of the binding, the 3D development tool still integrates a Lua virtual machine that can execute microscripts (or indeed more complex scripts), which are generally used for causing visual elements to move.

a. Smartphone
  Application using 3D real time in an intensive manner or mixed with other elements, such as viewing of 3D objects in augmented reality.
  b. Motor vehicle
  Application using 3D real time in an intensive manner, to replace all or some of a physical item of equipment (infotainment, cluster, etc.).

Computers or Web Applications

The binding method according to the present disclosure, which offers a direct gateway to PYTHON®, authorizes the rapid development of complex 3D applications without the need for specialized knowledge in low-level real-time 3D APIs.

If all the business application is written in PYTHON®, the use of Lua in parallel is possible/recommended, depending on the nature of the tasks and the expected performance.

a. Desktop
  Written in PYTHON®, the application can advantageously be carried on all the reference platforms (WINDOWS®, OS X®, LINUX®). This is the ideal format for developing business applications executed directly on a conventional workstation.
  b. Server
  The modular and portable nature of the 3D C++ engine/PYTHON® business application pair offer the possibility of having it function in "renderless" mode, i.e., by deactivating the image generator. The paradox is obtained of a real-time 3D imagery engine that calculates real-time 3D images but does not display them. This is a functionality that is very common in the "online massive," where a plurality of client software instances connect on the same server and must find the same simulation there. Here, too, PYTHON® is entirely suited for the development of a "server-side" application. This functionality is available under Unreal engine, in C++ alone, and under Unity3D in C# alone. The software environments carrying out the binding method according to the present disclosure open up this functionality to C++/PYTHON®/Lua/C#.

Computers or Smartphones

The binding method according to the present disclosure is particularly suitable for a high-performance and compact application on an office computer or smartphone/embedded, while offering the maximum accessibility to developers via the binding and Lua.

a. Office Computer
  Rapid, compact business application with moderate need of interoperability.
  b. Smartphone
  Rapid, compact business application with significant need of real-time 3D imagery.

Web Client Side

This refers to a recent development for "client-side" web applications (executed by the navigator or browser). The development of a business application 100% in C++ opens a first door to the WebAssembly/WebGL target. The virtual machine Lua, which is extremely compact (12000 lines of C), offers a second gateway.

The compilation of C++ in WebAssembly is a very recent technology. This is an assembler language for a virtual target CPU. The consensus on the specifications of a platform common to the main web navigators (FIREFOX®, APPLE®, GOOGLE®, MICROSOFT®) has just been validated, in March 2017.

Due to the compactness and portability of its C++ source code, the binding method according to the present disclosure and the implementation thereof for the transformation of models is an ideal technology for functioning in WebAssembly. The major issue is the size of the binary. To date, the WASM binary of a C/C++ library used together with the binding method according to the present disclosure represents 5 MegaOctets. By way of example, that of the UNREAL ENGINE® represents 35 MegaOctets. In WebAssembly, Unity3D must be limited to a sub-assembly of the functionalities present in C#.

Of course, the present disclosure is not limited to the embodiments described above, and a number of developments can be made to the embodiments, without departing from the scope of the present disclosure. Of course, the various features, types, variants, and embodiments of the present disclosure may be associated with one another, in accordance with various combinations, insofar as they are not mutually incompatible or exclusive. In particular, all the variants and embodiments described above can be combined with one another.

The invention claimed is:

1. A computer-implemented method for generating a binding between a software environment of one or more high-level interpreted languages and a C/C++ library to exhibit functionalities of the C/C++ library to the one or more high-level interpreted languages, the method comprising:

processing a definition of the binding, the definition having been previously written in a high-level language, the definition comprising functions to produce binding elements;

generating the binding elements exposed to the one or more high-level interpreted languages to produce a set of functions in C++ that are exposed to the one or more high-level interpreted languages, wherein generating the binding elements is further configured to allow the C/C++ library to call a written function in the one or more high-level interpreted languages to expand the functionalities of the C/C++ library;

compiling a C++ code and linking the C++ code to the C/C++ library;

obtaining a dynamic library integrating the C/C++ library and an interface layer compiled from the C++ code;

transforming a three-dimensional (3D) engine originating from the C/C++ library to be embedded in an item of equipment in which a software application is written in the high-level language;

importing the dynamic library;

accessing, via the dynamic library, the functionalities of the C/C++ library; and transforming 3D models originating from the C/C++ library into 3D models capable of being embedded in equipment provided with a Human Machine Interface (HMI) within mobility systems, the HMI being designed and processed using a 3D development tool, wherein the 3D models transforming includes exploiting, via an interpreter, the functionalities of the C/C++ library so that:
- the C/C++ library exhibits, via an application programming interface (API), 3D, video and audio functionalities,
- a 3D graphic driver exhibits, via an API, capacities of a 3D graphics processing unit (GPU) and transforms given instructions into GPU primitives, and
- wherein the 3D GPU processes the GPU primitives and transforms them into video signals to be displayed on a screen within the equipment;

wherein processing the definition comprises a distribution of processing between:
- high-level functionalities of each of the one or more high-level interpreted languages; and
- C++ functionalities of a C++ language that are supported in a transparent manner by the binding and will be made accessible in the high-level language.

2. The method according to claim 1, wherein the definition of the binding is written in a form of a program in the high-level language and using an application programming interface (API) describing the API of the C/C++ library as the API is to be exposed to developers of the high-level language.

3. The method according to claim 2, further comprising processing documentation attached to the C/C++ library as a target high-level language and generating an XML file.

4. The method according to claim 2, wherein processing the definition comprises a distribution of processing between:
- high-level functionalities of each of the one or more high-level interpreted languages; and
- C++ functionalities of a C++ language that are supported in a transparent manner by the binding and will be made accessible in the high-level language.

5. The method according to claim 2, wherein the definition of the binding comprises anticipated parameters for the functions and returned values.

6. The method according to claim 1, wherein the definition of the binding comprises anticipated parameters for the functions and returned values.

7. The method according to claim 6, further comprising processing documentation attached to the C/C++ library as a target high-level language and generating an XML file.

8. The method according to claim 6, wherein processing the definition comprises a distribution of processing between:
- high-level functionalities of each of the one or more high-level interpreted languages; and
- C++ functionalities of a C++language that are supported in a transparent manner by the binding and will be made accessible in the high-level language.

9. The method according to claim 1, further comprising processing documentation attached to the C/C++ library as a target high-level language and generating an XML file.

10. The method according to claim 1, further comprising processing documentation attached to the C/C++ library as a target high-level language and generating an XML file.

11. A non-transitory computer-readable storage medium having computer-readable instructions stored thereon, the computer-readable instructions configured to instruct one or more processors to:

process a definition of a binding between a software environment of one or more high-level interpreted languages and a C/C++ library to exhibit functionalities of the C/C++ library to the one or more high-level interpreted languages, the definition comprising functions to produce binding elements;

generate the binding elements to enable the C/C++ library to call a written function in the one or more high-level interpreted languages to expand the functionalities of the C/C++ library, the binding elements exposed to the one or more high-level interpreted languages to produce a set of functions in C++that are exposed to the one or more high-level interpreted languages, and to allow the C/C++library to call a written function in the one or more high-level interpreted languages to expand the functionalities of the C/C++ library;

compile a C++ code and link the C++ code to the C/C++ library;

obtain a dynamic library integrating the C/C++library and an interface layer compiled from the C++ code;

transform a three-dimensional (3D) engine originating from the C/C++ library to be embedded in an item of equipment in which a software application is written in the one or more high-level interpreted languages;

import the dynamic library;

access, via the dynamic library, the functionalities of the C/C++ library; and transform 3D models originating from the C/C++ library into 3D models configured to embed in equipment provided with a Human Machine Interface (HMI) within mobility systems, the HMI being designed and processed using a 3D development tool, wherein the 3D models being transformed includes exploiting, via an interpreter, the functionalities of the C/C++library so that:
- the C/C++ library exhibits, via an application programming interface (API), 3D, video, and audio functionalities,
- a 3D graphics driver exhibits, via an API, capacities of a 3D graphics processing unit (GPU) and transforms given instructions into GPU primitives, and
- the 3D graphics processing unit processes the GPU primitives and transforms them into video signals to be displayed on a screen within the equipment.

12. A computing system, comprising:
one or more processors;

one or more non-transitory computer-readable media having computer-readable instructions stored thereon, the computer-readable instructions configured to instruct the one or more processors to:
  process a definition of a binding between a software environment of one or more high-level interpreted languages and a C/C++ library to exhibit functionalities of the C/C++ library to the one or more high-level interpreted languages, the definition comprising functions to produce binding elements;
  generate the binding elements to enable the C/C++ library to call a written function in the one or more high-level interpreted languages to expand the functionalities of the C/C++ library, the binding elements exposed to the one or more high-level interpreted languages to produce a set of functions in C++ that are exposed to the one or more high-level interpreted languages, and to allow the C/C++ library to call a written function in the one or more high-level interpreted languages to expand the functionalities of the C/C++ library; and
  compile a C++ code and link the C++ code to the C/C++ library;
  obtain a dynamic library integrating the C/C++ library and an interface layer compiled from the C++ code;
  transform a three-dimensional (3D) engine originating from the C/C++ library to be embedded in an item of equipment in which a software application is written in the one or more high-level interpreted languages;
  import the dynamic library;
  access, via the dynamic library, the functionalities of the C/C++ library; and
  transform 3D models originating from the C/C++ library into 3D models configured to embed in equipment provided with a Human Machine Interface (HMI) within mobility systems, the HMI being designed and processed using a 3D development tool, wherein the 3D models being transformed includes exploiting, via an interpreter, functionalities of the C/C++ library so that:
    the C/C++ library exhibits, via an application programming interface (API), 3D, video, and audio functionalities,
    a 3D graphics driver exhibits, via an API, capacities of a 3D graphics processing unit (GPU) and transforms given instructions into GPU primitives, and
    the 3D graphics processing unit processes the GPU primitives and transforms them into video signals to be displayed on a screen within the equipment.

13. A computer-implemented method for generating a binding between a software environment of one or more high-level interpreted languages and a C/C++ library to exhibit functionalities of the C/C++ library to the one or more high-level interpreted languages, the method comprising:
  processing a definition of the binding, the definition having been previously written in a high-level language, the definition comprising functions to produce binding elements;
  generating the binding elements exposed to the one or more high-level interpreted languages to produce a set of functions in C++ that are exposed to the one or more high-level interpreted languages, wherein generating the binding elements is further configured to allow the C/C++ library to call a written function in the one or more high-level interpreted languages to expand the functionalities of the C/C++ library;
  compiling a C++ code and linking the C++ code to the C/C++ library;
  obtaining a static library configured to embed the one or more high-level interpreted languages directly into the compiled C++ code;
  transforming a three-dimensional (3D) engine originating from the C/C++ library to be embedded in an item of equipment in which a software application is written in the high-level language;
  importing the static library;
  accessing, via the static library, the functionalities of the C/C++ library; and
  transforming 3D models originating from the C/C++ library into 3D models configured to be embedded in equipment provided with a Human Machine Interface (HMI) within mobility systems,
  wherein the 3D models transforming includes exploiting, via an interpreter, functionalities of the C/C++ library so that:
    the C/C++ library exhibits, via an application programming interface (API), 3D, video, and audio functionalities;
    a 3D graphics driver exhibits, via an API, capacities of a 3D graphics processing unit (GPU) and transforms given instructions into GPU primitives; and
    the 3D GPU processes the GPU primitives and transforms them into video signals to be displayed on a screen within the equipment.

* * * * *